No. 657,765. Patented Sept. 11, 1900.
G. J. GIBBS.
BELT DRIVING MECHANISM.
(Application filed Jan. 24, 1900.)
(No Model.) 2 Sheets—Sheet 1.
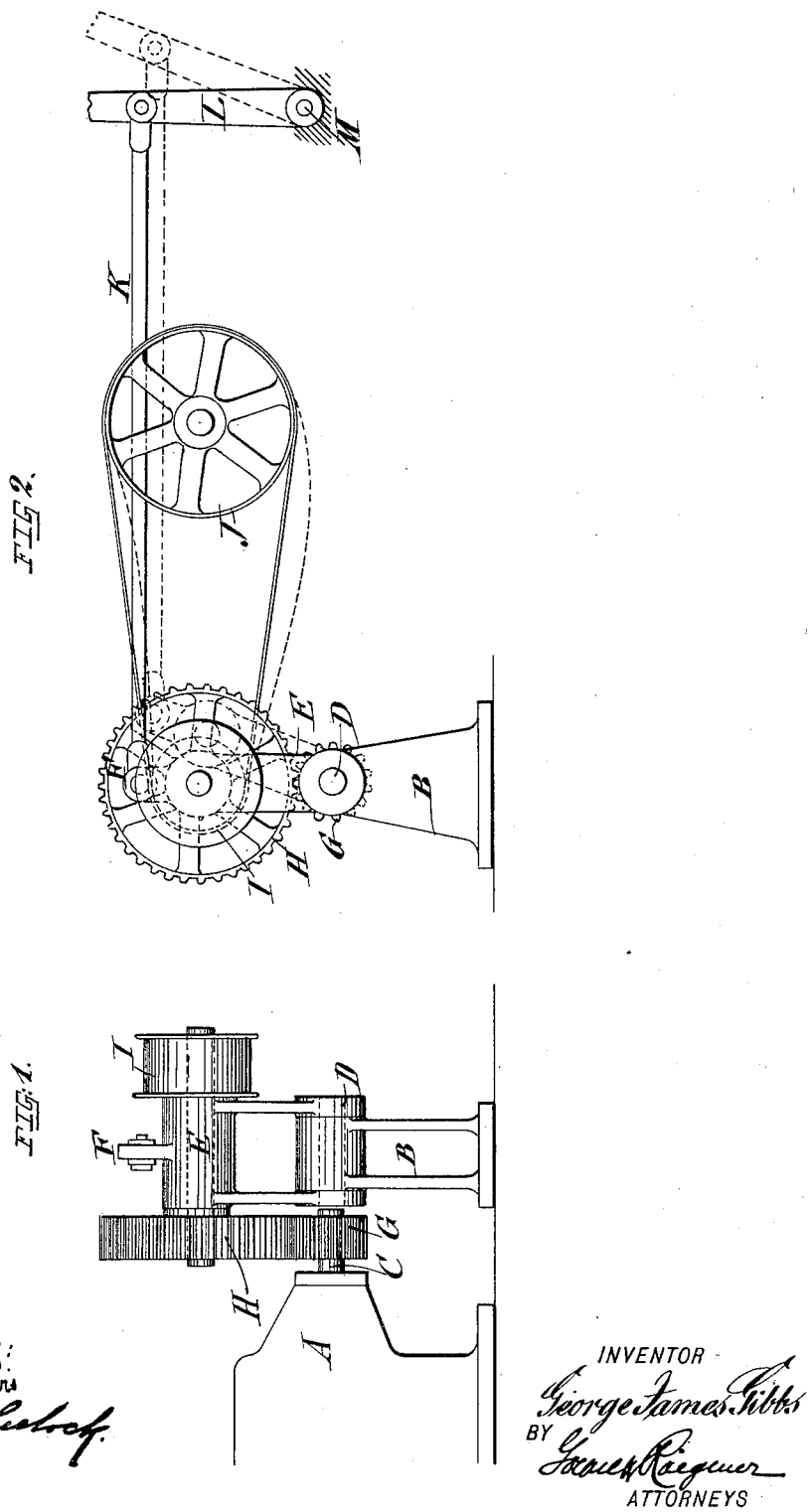

No. 657,765. Patented Sept. 11, 1900.
G. J. GIBBS.
BELT DRIVING MECHANISM.
(Application filed Jan. 24, 1900.)

(No Model.) 2 Sheets—Sheet 2.

WITNESSES:

INVENTOR
George James Gibbs
BY
ATTORNEYS.

UNITED STATES PATENT OFFICE.

GEORGE JAMES GIBBS, OF YORK, ENGLAND.

BELT DRIVING MECHANISM.

SPECIFICATION forming part of Letters Patent No. 657,765, dated September 11, 1900.

Application filed January 24, 1900. Serial No. 2,593. (No model.)

*To all whom it may concern:*

Be it known that I, GEORGE JAMES GIBBS, a subject of the Queen of Great Britain, and a resident of York, in the county of York and Kingdom of Great Britain, have invented certain new and useful Improvements in Belt Driving Mechanisms, of which the following is a specification.

This invention relates to improvements in the means of transmitting power from a shaft or a motor to a machine which it is required to drive by means of a belt running on pulleys. The employment of a belt running around a pulley on a motor and a pulley on the machine to be driven is a common form of power transmission, though usually it is found necessary to have one or more intermediate counter-shafts with pulleys attached in order to get the right speed and so that the speeds may be changed conveniently. The objection to this form of driving is that the tension of the belt alters considerably, owing to the stretching of the material of which it is made, and this gives rise to slip of the belt on the pulleys and loss of power. Also when a belt is used for driving from a very small pulley onto a large one near to it there is loss through so little of the periphery of the small pulley being in contact with the belt. This is especially the case when a machine is driven direct by an electric motor placed near it, and my invention is especially applicable for dealing with such conditions. The particular improvement resides in constructing an intermediate frame carrying a pulley connected either to the driving-shaft of the motor or to the first-motion shaft of the driven machine through a wheel and pinion so arranged that the frame can oscillate around the said shaft as a center, thus enabling me to alter the distance apart of the pulleys without separating their connection to the driving or driven shaft, as the case may be.

The nature of my improvements will be readily understood on reference to the accompanying drawings, in which similar letters refer to similar parts throughout the views.

Figure 4:
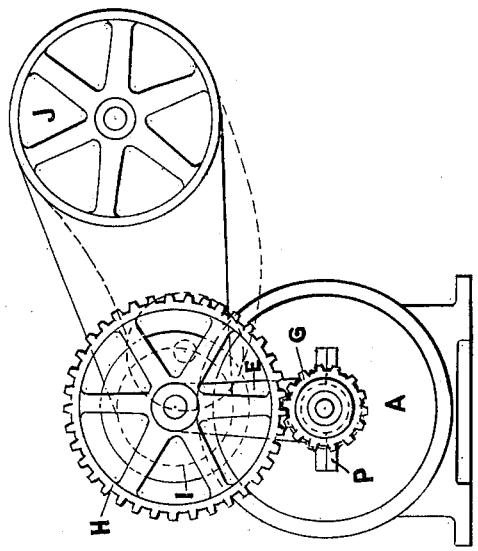
Figure 3:
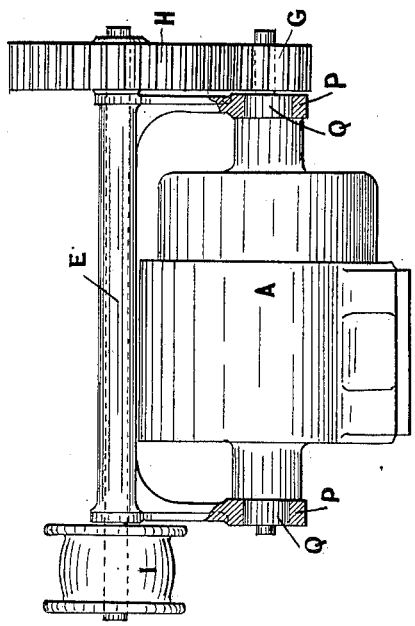

Figure 1 is an end elevation of the device applied to a motor, in which the standard carrying the fulcrum of the swinging bracket is independent of the framework of the motor. Fig. 2 is a side elevation of the same device, showing the driven pulley and a means of operating the swinging bracket. Fig. 3 is a side elevation showing a modification of the device as applied to an electric or other motor so as to be self-contained. Fig. 4 is an end elevation of the latter device, showing also the pulley of the driven machine.

Referring first to Figs. 1 and 2, A represents a motor, either electric or otherwise, with its spindle C projecting at one end, to which is attached a pinion G. B is a standard fixed independently of the motor, but so that the hinge-pin D has its axis coincident with the axis of the pinion G. E is a bracket or link connected to the standard B by the pin D, so that it can oscillate freely about the axis of D, and therefore about the axis of the motor. At its opposite end this bracket carries a bearing, in which runs a spindle, to which is attached on one side the pulley I and on the other side the spur-wheel H, gearing into the pinion G on the motor-spindle. J is the pulley on the machine to be driven. L is a lever with its fulcrum at M, and K is a rod connecting this lever with the swinging bracket E through the lug F. It will be seen that by means of this lever and connecting-rod the bracket E can be oscillated about the pin D without interfering with the gearing of the spur-wheel H in the pinion G and that consequently the belt may be kept tight when required to drive a machine or loose when the machine is idle, and this without stopping the motor. Any desired tension may be given to the belt, thus enabling a driven machine to be started slowly. When the driven machine is required to run for some time, means are provided for holding the lever L stationary in any desired position. If desired, the standard B can be constructed in one piece with the framework of the motor A.

Figs. 3 and 4 show a construction of the same nature as Fig. 1; but in order to make the arrangement of the motor and the gear self-contained the swinging bracket E is considerably widened and is carried by projections Q on the end of the motor-bearings. This forms a neat and effective apparatus, which may be controlled by any ordinary belt-striking gears, such as the lever and connecting-rod shown in Fig. 1, or by a segment or other device attached to the framework of the motor itself. The bracket can be turned down out of the way if it is required to inspect the motor or it may easily be detached altogether by disconnecting the bearings P. The pulley on the driven machine is shown at J, and the position of the swinging bracket when the belt is slack is shown in this as in the other views by dotted lines. The operation of starting and stopping a machine by this means is much less wearing to a belt than the ordinary fast-and-loose pulley, and the belt is readily removed altogether. It also enables a high-speed machine to be started gradually, and it is especially applicable, therefore, to electromotors and their driven machines or mechanisms and the shafts and axles of automobile vehicles. Another advantage of this method is that the pulley I or J can be readily changed for one of a different size, and thus an increase or reduction of speed is obtained.

The connecting-rod K may be actuated by any suitable striking-gear adapted to the particular position of the machine to be driven, that shown in the drawings forming no part of my present invention.

I am aware that prior to my invention an oscillating bracket has been employed for forming a movable connection between toothed wheels and between toothed wheels and chains for the purpose of adjusting the chain; also that movable jockey or riding pulleys have been used for the purpose of tightening and slackening belts, and thereby starting and stopping a driven machine. I therefore do not claim such a combination broadly; but What I do claim as my invention, and desire to secure by Letters Patent, is—

In a belt driving mechanism, the combination of a motor-shaft, a gear-wheel on said shaft, a swinging bracket pivoted at one end concentrically with said shaft, a counter-shaft journaled in the other end of said bracket, a gear-wheel on the counter-shaft, the same meshing with aforenamed gear-wheel, the machine to be driven, a belt-and-pulley connection between said counter-shaft and the machine to be driven, and means for moving and securing said bracket, substantially as set forth.

Signed at the city of York, in the county of York and Kingdom of Great Britain, this 8th day of January, A. D. 1900.

GEORGE JAMES GIBBS.

Witnesses:
   CHARLES DOWNEY,
   GEORGE WILLIAM CURRY.